(12) United States Patent
Liu et al.

(10) Patent No.: US 6,753,060 B1
(45) Date of Patent: *Jun. 22, 2004

(54) METHOD FOR IMPROVING PERFORMANCE OF THIN FILM RECORDING MEDIA AND MEDIA OBTAINED THEREBY

(75) Inventors: Jianwei Liu, Fremont, CA (US); Michael Joseph Stirniman, Fremont, CA (US); Wen Hong Liu, San Jose, CA (US); Jing Gui, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/106,485

(22) Filed: Mar. 27, 2002

Related U.S. Application Data

(60) Provisional application No. 60/288,959, filed on May 4, 2001.

(51) Int. Cl.⁷ .............................................. G11B 5/725
(52) U.S. Cl. ................. 428/65.4; 428/421; 428/704; 428/694 TC; 428/694 TF; 428/336
(58) Field of Search ................. 428/336, 421, 428/704, 694 TC, 694 TF, 65.4

(56) References Cited

U.S. PATENT DOCUMENTS

| | | |
|---|---|---|
| 3,234,304 A | 2/1966 | Nichols et al. |
| 4,018,967 A | 4/1977 | Roller et al. |
| 4,446,193 A | 5/1984 | Afzali-Ardakani et al. |
| 4,526,833 A | 7/1985 | Burguette et al. |
| 4,613,548 A | 9/1986 | Lum |
| 4,729,924 A | 3/1988 | Skorjanec et al. |
| 5,030,478 A | 7/1991 | Lin et al. |
| 5,273,830 A | 12/1993 | Yaguchi et al. |
| 5,587,217 A | 12/1996 | Chao et al. |
| 5,631,041 A | 5/1997 | Kanaizuka et al. |
| 5,677,051 A | 10/1997 | Ueda et al. |
| 5,718,942 A | 2/1998 | Vurens et al. |
| 5,851,601 A * | 12/1998 | Mehmandoust et al. .... 427/561 |
| 5,908,817 A | 6/1999 | Perettie et al. |
| 6,096,385 A | 8/2000 | Yong et al. |
| 6,099,762 A | 8/2000 | Lewis |
| 6,204,504 B1 | 3/2001 | Lewis |

FOREIGN PATENT DOCUMENTS

JP        09-052707    *  2/1997    ............ G11B/5/72

* cited by examiner

Primary Examiner—Stevan A. Resan
(74) Attorney, Agent, or Firm—McDermott, Will & Emery

(57) ABSTRACT

A data/information storage and retrieval medium, comprising:
 (a) a disk-shaped substrate including at least one surface with a layer stack thereon and including at least one magnetic or magneto-optical ("MO") recording layer and an uppermost, protective overcoat layer comprising a carbon (C)-based material; and
 (b) a lubricant topcoat layer on the protective overcoat layer, the lubricant topcoat layer treated solely with UV radiation at a dosage sufficient to increase the glide yield, decrease the glide noise, and increase the number of CSS pass cycles of the medium before failure, relative to that of the same medium but with an untreated lubricant topcoat layer.

5 Claims, 2 Drawing Sheets

METHOD FOR IMPROVING PERFORMANCE OF THIN FILM RECORDING MEDIA AND MEDIA OBTAINED THEREBY

CROSS-REFERENCE TO PROVISIONAL APPLICATION

This application claims priority from U.S. provisional patent application Ser. No. 60/288,959 filed May 4, 2001, the entire disclosure of which is incorporated herein by reference.

CROSS-REFERENCE TO RELATED APPLICATION

This application discloses subject matter related to subject matter disclosed in co-pending, commonly assigned U.S. patent application Ser. No. 09/986,910 filed Nov. 13, 2001.

FIELD OF THE INVENTION

The present invention relates to an improved method for increasing or enhancing the performance, e.g., durability, of a thin film or layer of a composite lubricant material applied to the surface of a thin film recording medium, particularly when the latter is utilized in combination with a flying head read/write transducer in Contact Start/Stop ("CSS") operation, and to improved thin film recording media obtained thereby. The invention finds particular utility in the manufacture and use of thin film type magnetic or magneto-optical ("MO") data/information storage and retrieval media comprising a layer stack or laminate of a plurality of thin film layers formed on a suitable substrate, e.g., a disk-shaped substrate, wherein a thin topcoat layer comprised of a composite lubricant material is applied to a carbon-based protective overcoat layer forming the upper surface of the layer stack or laminate for improving tribological performance of the media when utilized with read/write transducer heads operating at very low flying heights.

BACKGROUND OF THE INVENTION

Magnetic and MO media are widely employed in various applications, particularly in the computer industry for data/information storage and retrieval purposes. A magnetic medium in, e.g., disc form, such as utilized in computer-related applications, comprises a non-magnetic, disk-shaped substrate, e.g., of glass, ceramic, glass-ceramic composite, polymer, metal, or metal alloy, typically an aluminum (Al)-based alloy such as aluminum-magnesium (Al-Mg), having at least one major surface on which a layer stack or laminate comprising a plurality of thin film layers constituting the medium are sequentially deposited. Such layers may include, in sequence from the substrate deposition surface, a plating layer, e.g., of amorphous nickel-phosphorus (Ni-P), a polycrystalline underlayer, typically of chromium (Cr) or a Cr-based alloy such as chromium-vanadium (Cr-V), a magnetic layer, e.g., of a cobalt (Co)-based alloy, and a protective overcoat layer, typically of a carbon (C)-based material, e.g., diamond-like carbon ("DLC") having good tribological properties. A similar situation exists with MO media, wherein a layer stack or laminate is formed on a substrate deposition surface, which layer stack or laminate typically comprises a reflective layer, e.g., of a metal or metal alloy, one or more rare-earth thermo-magnetic (RE-TM) alloy layers, one or more transparent dielectric layers, and a protective overcoat layer, e.g., a DLC layer, for functioning as reflective, transparent, writing, writing assist, and read-out layers, etc.

Thin film magnetic and MO media in disk form, such as described supra, are typically lubricated with a thin topcoat film or layer comprised of a polymeric lubricant, e.g., a perfluoropolyether, to reduce wear of the disc when utilized with data/information recording and read-out transducer heads operating at low flying heights, as in a hard disk system functioning in a contact Start/Stop ("CSS") mode. Conventionally, the thin film of lubricant is applied to the disc surface(s) during manufacture by dipping into a bath containing a small amount of lubricant, e.g., less than about 1% by weight of a fluorine-containing polymer, dissolved in a suitable solvent, typically a perfluorocarbon, fluorohydrocarbon, or hydrofluoroether.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop ("CSS") cycle commences when the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in air, sliding against the surface of the disk, and stopping.

It is considered desirable during reading and recording operations, and for obtainment of high areal recording densities, to maintain the transducer head(s) as close to the associated recording surface(s) as is possible, i.e., to minimize the "flying height" of the head(s). Thus a smooth recording surface is preferred, as well as a smooth opposing surface of the associated transducer head, thereby permitting the head and the disk surface to be positioned in close proximity, with an attendant increase in predictability and consistent behavior of the air bearing supporting the head during motion.

The lubricity properties of disk-shaped recording media are generally measured and characterized in terms of dynamic and/or static coefficients of friction. The former type, i.e., dynamic friction coefficient, is typically measured utilizing a standard drag test in which the drag produced by contact of a read/write transducer head with a disk surface is determined at a constant spin rate, e.g., 1 rpm. The latter type, i.e., static coefficients of friction (also known as "stiction" values), are typically measured utilizing a standard contact start/stop ("CSS") test in which the peak level of friction is measured as the disk starts rotating from zero (0) rpm to a selected revolution rate, e.g., 5,000 rpm. After the peak friction has been measured, the disk is brought to rest, and the start/stop process is repeated for a selected number of start/stop cycles. An important property of a disk which is required for good long-term disk and drive performance is that the disk retain a relatively low coefficient of friction after many start/stop cycles or contacts with the read/write transducer head, e.g., 20,000 start/stop cycles.

The most commonly employed lubricants utilized with thin film, disk-shaped magnetic and MO media, i.e., perfluoropolyether ("PFPE")-based lubricants, perform well under ambient conditions but not under conditions of higher temperature and high or low humidity. Studies, as described in, for example U.S. Pat. No. 5,587,217, the entire disclosure of which is incorporated herein by reference, have indicated that the tribological properties, and perhaps corrosion resistance, of perfluoropolyether-based lubricants utilized in the manufacture of thin film recording media can be substantially improved by addition thereto of an appropriate amount of a cyclotriphosphazene-based lubricant additive, e.g., a polyphenoxy cyclotriphosphazene comprising substituted or unsubstituted phenoxy groups, to form what is termed a "composite lubricant".

Currently, bis(4-fluorophenoxy)—tetrakis (3-trifluoromethyl phenoxy) cyclotriphospazene (available as X-1P™ from Dow Chemical Co., Midland, Mich.) is the additive most commonly utilized with perfluoropolyether-based lubricants for forming composite lubricants for use with thin film magnetic and MO media. However, as disclosed in U.S. Pat. Nos. 5,719,942 and 5,908,817, the disclosures of which are incorporated herein by reference, the use of X-1P as a lubricant additive for forming composite lubricants comprising the perfluoropolyether-based lubricants commonly employed in the data storage industry (e.g., Fomblin Z-DOL™ and Fomblin Z-TETRAOL™, each available from Ausimont, Thorofare, N.J.) incurs a disadvantage in that the former (i.e., the cyclotriphasphazene-based lubricant additive) has very low solubility in the latter (i.e., the PFPE-based primary lubricant).

For example, X-1P, in combination with Z-DOL at levels up to about 5 wt. %, reduces stiction and increases the stability of Z-DOL. However, because X-1P is virtually immiscible in PFPE-based lubricants, phase separation typically occurs at the optimal X-1P/PFPE ratios. The phase separation leads to chemical non-uniformity of the lubricant film on the media (e.g., disk) surface, as by the so-called "balling" effect, which tends to affect the tribology (i.e., durability) of the head/disk interface, particularly when the thickness of the X-1P exceeds about 1–2 Å. As a consequence of the poor compatibility of the X1P lubricant additive with the Z-DOL or Z-TETRAOL primary lubricant, the maximum amount of X1P that can be used therewith is severely limited, typically to about 10% of the total lubricant thickness. Moreover, X-1P/PFPE mixtures do not exhibit performance enhancement over PFPE alone when the X-1P layer thickness is less than about 1 Å, or at X-1P concentrations less than about 1 wt. %. Thus, according to current practice, the effective concentration window for use of X-1P in combination with PFPE is quite narrow, and special process control is required to achieve optimal performance. Notwithstanding such special process control, phase separation of the X-1P additive, accelerated lubricant loss, and a large amount of transducer head smear frequently occur even with such low additive contents.

U.S. Pat. No. 6,099,762, the entire disclosure of which is incorporated herein by reference, discloses a process for enhancing the bonding, thus durability, of thin lubricant layers comprised of a PFPE, a phosphazene, or both, to media surfaces by means of a process comprising exposing the lubricant layer or film to infra-red ("IR") and ultra-violet ("UV") radiation, either simultaneously or sequentially, wherein the IR radiation effects heating of the lubricant layer or film to a temperature above about 150° F. but less than about 500° F., and the UV radiation comprises a wavelength component of about 185 nm for photolytically generating ozone ($O_3$) in the vicinity of the lubricant layer or film for effecting bonding thereof to the media surface. This process for enhancing bonding of the composite lubricant films to the media surface, however, is not performed in a manner as to effect optimal stabilization of the composite lubricant films and enhancement of their durability when utilized in CSS-type operation.

In view of the above, there exists a clear need for improved methodology for applying thin films of composite lubricants to surfaces of thin film recording media, e.g., in disk form, wherein the composite lubricant films include a primary lubricant material comprised of a perfluoropolyether compound and a lubricant additive comprised of a cyclotriphosphazene derivative, which methodology overcomes the drawbacks and disadvantages of the conventional methodology described above. More specifically, there exists a need for improved methodology for applying and treating composite lubricant films comprised of a primary lubricant and a lubricant additive for enhancement of the stability, durability, and tribological properties of disk-shaped thin film magnetic and MO media which operate under CSS conditions.

The present invention addresses and solves problems and difficulties in achieving formation of stabilized, high performance, high durability, composite lubricant thin films utilized in the manufacture of thin film, disk-shaped magnetic and MO data/information storage and retrieval media for operation under CSS conditions, wherein the composite lubricant thin films are comprised of a primary lubricant and a lubricant additive, while maintaining full compatibility with all aspects of conventional automated manufacturing technology therefor, including productivity requirements necessary for economic competitiveness. In addition, the present invention provides improved thin film magnetic and MO media having stabilized, high durability lubricant films comprised of a primary lubricant and a lubricant additive. Further, the methodology afforded by the present invention enjoys diverse utility in the manufacture of various other devices and/or articles requiring formation of stable, high performance, composite lubricant thin films thereon.

DISCLOSURE OF THE INVENTION

An advantage of the present invention is an improved method for increasing the performance of a data/information storage and retrieval medium when utilized in Contact Start/Stop ("CSS") operation.

Another advantage of the present invention is an improved method for increasing the performance of a disk-shaped magnetic or magneto-optical ("MO") recording medium when utilized in Contact Start/Stop ("CSS") operation.

Yet another advantage of the present invention is a data/information storage and retrieval medium exhibiting improved performance when utilized in Contact Start/Stop ("CSS") operation.

Still another advantage of the present invention is a disk-shaped magnetic or magneto-optical ("MO") recording medium exhibiting improved performance when utilized in Contact Start/Stop ("CSS") operation.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of increasing the performance of a data/information storage and retrieval medium when utilized in Contact Start/Stop ("CSS") operation, which method comprises steps of:

(a) providing a data/information storage medium including at least one surface;

(b) applying a thin layer or film of a composite lubricant to the at least one surface of the medium;

(c) treating the thin layer or film of the composite lubricant solely with UV radiation at a dosage sufficient to:

(i) increase the glide yield of the medium, relative to that provided by the same medium but with an untreated thin layer or film of composite lubricant;

(ii) decrease the glide noise of the medium, relative to that provided by the same medium but with an untreated thin layer or film of composite lubricant; and (iii) increase the number of CSS pass cycles of the medium before failure, relative to that provided by the same medium but with an untreated thin layer or film of composite lubricant.

According to embodiments of the present invention, step (a) comprises providing a disk-shaped magnetic or magneto-optical ("MO") recording medium as the data/information storage medium; and according to particular embodiments of the present invention, step (a) comprises providing a disk-shaped magnetic or MO recording medium wherein the at least one surface comprises a layer of a carbon (C)-based material; and step (b) comprises applying a thin layer or film of a said composite lubricant comprising at least one perfluoropolyether compound as a primary lubricant and at least one phosphazene derivative as a lubricant additive In accordance with certain embodiments of the present invention, step (b) comprises applying a thin layer or film, ranging from about 10 to about 20 Å thick, of a composite lubricant comprising bis (4-fluorophenoxy)—tetrakis (3-trifluoromethyl phenoxy) cyclo-triphosphazene as said at least one lubricant additive.

According to alternative embodiments of the present invention, step (b) comprises applying the thin layer or film of the composite lubricant in the form of a single layer containing the at least one perfluoropolyether compound and the at least one phosphazene derivative; or step (b) comprises applying the thin layer or film of a composite lubricant in the form of separate sub-layers of the at least one perfluoropolyether compound and the at least one phosphazene derivative.

In accordance with embodiments of the present invention, step (c) comprises treating the thin layer or film of composite lubricant solely with UV radiation from a source which principally supplies UV at energies below the threshold energy for photolytic generation of ozone ($O_3$); e.g., step (c) comprises supplying UV radiation in the wavelength range from about 185 to about 254 nm, with about 70–80% of the radiation being at about 254 nm, and at an intensity from about 10 to about 35 mw/cm$^2$ for an interval ranging from about 30 sec. to about 15 min.

According to particular embodiments of the present invention, step (c) comprises supplying said UV irradiation at an intensity of about 35 mW/cm$^2$ for an interval ranging from about 30 sec. to about 4 min.; and step (c) further comprises preventing contact of the thin layer or film of composite lubricant with oxygen ($O_2$) during the treatment with UV radiation, whereby photolytic generation of $O_3$ is further minimized or substantially prevented.

In accordance with a preferred embodiment of the present invention, the method forms part of a process for the manufacture of said data/information storage and retrieval medium, wherein:

step (a) comprises providing as the data/information storage and retrieval medium a disk-shaped magnetic or magneto-optical ("MO") medium, wherein the at least one surface comprises a layer of a carbon (C)-based material;

step (b) comprises applying an about 10 to about 20 Å thick layer or film of the composite lubricant to said substrate surface, the composite lubricant comprising at least one perfluoropolyether compound as a primary lubricant and at least one phosphazene derivative as a lubricant additive; and step (c), comprises treating the thin layer of composite lubricant solely tilt with UV radiation from a source which supplies UV radiation in the range from about 185 to about 254 nm, with about 70–80% of the radiation being at about 254 nm, and at an intensity from about 10 to about 35 mw/cm$^2$ for an interval ranging from about 30 sec. to about 15 min.

Another aspect of the present invention is a data/information storage and retrieval medium with enhanced Contact Start/Stop ("CSS") performance, comprising:

(a) a disk-shaped substrate including at least one surface, a layer stack formed on the at least one surface and including at least one magnetic or magneto-optical ("MO") recording layer and an uppermost, protective overcoat layer comprising a carbon (C)-based material; and (b) a lubricant topcoat layer on the protective overcoat layer, the lubricant topcoat layer treated solely with UV radiation at a dosage sufficient to:

(i) increase the glide yield of the medium, relative to that provided by the same medium but with an untreated lubricant topcoat layer;

(ii) decrease the glide noise of the medium, relative to that provided by the same medium but with an untreated lubricant topcoat layer; and (iii) increase the number of CSS pass cycles of the medium before failure, relative to that provided by the same medium but with an untreated lubricant topcoat layer.

According to embodiments of the present invention, the lubricant topcoat layer (b) is from about 10 to about 20 Å thick and comprises at least one perfluoropolyether compound as a primary lubricant and at least one phosphazene derivative as a lubricant additive, e.g., the at least one phosphazene derivative comprises bis (4-fluorophenoxy)—tetrakis (3-trifluoromethyl phenoxy) cyclotriphosphazene.

In accordance with alternative embodiments of the present invention, the lubricant topcoat layer (b) is in the form of a single layer containing the at least one perfluoropolyether compound and the at least one phosphazene derivative; or the lubricant topcoat layer (b) is in the form of separate sub-layers of the at least one perfluoropolyether compound and the at least one phosphazene derivative.

Still another aspect of the present invention is a data/information storage and retrieval medium with enhanced Contact Start/Stop ("CSS") performance, comprising:

(a) a disk-shaped substrate including at least one surface, a layer stack formed on the at least one surface and including at least one magnetic or magneto-optical ("MO") recording layer and an uppermost, protective overcoat layer comprising a carbon (C)-based material; and (b) means for increasing the glide yield, decreasing the glide noise, and increasing the number of CSS pass cycles of the medium before failure of said medium, relative to the same medium but without means (b).

Additional advantages and aspects of the present invention will become readily apparent to those skilled in the art from the following detailed description, wherein embodiments of the present invention are shown and described, simply by illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, wherein.

DESCRIPTION OF THE INVENTION

Figure 1:
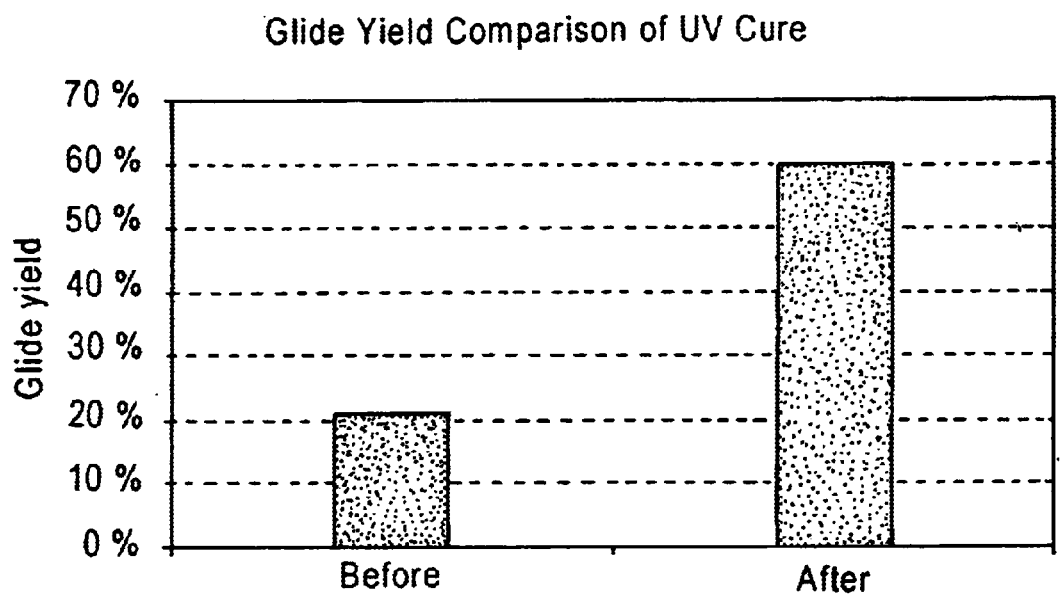
FIGS. 1–3 are bar graphs for illustrating the improvement in glide yield, glide noise, and CSS pass cycles, respectively, of disk-shaped, thin film magnetic recording media provided by treatment of composite lubricant films according to the present invention, relative to similar media with untreated composite lubricant films.

The present invention is based upon the recognition that the above-described limitations and drawbacks associated with the use of composite lubricant compositions including at least one PFPE primary lubricant material and at least one cyclotriphosphazene-based lubricant additive in applying and forming lubricant topcoats in the manufacture of thin film magnetic and/or MO recording media, e.g., hard disks operated according to a CSS regime, can be substantially avoided, or at least minimized, by performing an in situ performance enhancement process, e.g., durability enhancement under CSS operating conditions, wherein a thin film of the composite lubricant applied (in a conventional manner) to the surface of a recording medium comprised of a laminate or stack of thin film layers is treated solely with UV radiation at a dosage selected for enhancing, i.e., increasing the performance, e.g., tribological performance and durability under CSS operating conditions. The inventive methodology differs in several significant respects from that of the prior art, as exemplified by the process disclosed in U.S. Pat. No. 6,099,762, described supra, in that increase in the dynamic performance characteristics of the composite lubricant film when utilized under CSS operating conditions, including, inter alia, glide yield, glide noise, and CSS pass cycles, is a key feature or objective of the present invention, which feature or objective is in addition to the obtainment of any reduction in phase separation and/or bonding of the lower portion of the lubricant film to the surface of the recording medium resulting from the UV irradiation. As a consequence, the selected UV irradiation dosage process according to the invention advantageously facilitates formation of enhanced durability composite lubricant films containing a lubricant additive, e.g., X-1P, which composite lubricant films exhibit enhanced durability and tribological performance vis-à-vis that obtainable by the prior art. The inventive methodology thus differs from that of U.S. Pat. No. 6,099,762 in at least the following aspects:

(1) irradiation of the applied composite lubricant thin film according to the present invention is performed at ambient temperature, solely by means of a source of UV radiation. Stated differently, since according to the present invention, the lubricant thin film is not heated before, during, or after the treatment with UV, it is not exposed to IR irradiation prior to, simultaneously with, or subsequent to the UV irradiation;

(2) since, according to the present invention, it is desired that photolytic generation of ozone ($O_3$) at or near the lubricant thin film due to UV irradiation in an oxygen ($O_2$)-containing atmosphere be prevented, or at least minimized, a UV source is utilized which emits principally in the wavelength range above which $O_3$ is generated, e.g., by means of a UV source wherein about 70–80% of the irradiated photons have a wavelength of about 254 nm. Stated differently, according to the present invention, a UV source is utilized which emits principally at about 254 nm;

(3) according to the invention, contact of the thin lubricant film with $O_2$ is substantially eliminated during irradiation thereof with UW, e.g. by purging $O_2$ from the treatment chamber containing the composite lubricant-coated workpiece, as by flowing a stream of an inert gas (e.g., nitrogen, $N_2$) thereover, in order to further reduce the likelihood of $O_3$ generation in the vicinity of the composite lubricant film; and (4) according to the invention, the composite lubricant film is treated with a controlled dosage of the UV radiation which is pre-selected for providing optimal improvement, i.e., enhancement, of the durability and tribological performance of lubricated media under dynamic operating conditions, i.e., CSS conditions. For example, according to the invention, the composite lubricant films may be treated with principally 254 nm UV radiation at an intensity in the range from about 10 to about 35 mw/cm$^2$ for an interval ranging from about 30 sec. to about 15 min.

In accordance with embodiments of the present invention, the primary lubricant material of the composite lubricant may comprise one or more PFPE compounds, available on the market under trade names such as FOMBLIN™ Z-DOL, Z-TETRAOL, Z-DOL TXS, AM 2001, and AM 3001 (Ausimont Montedison Group, Thorofare, N.J.), KRY-TOX™ (DuPont Co., Delaware), and DEMNUM™ SA, SH, SP, and SY (Daikin Industries, Ltd., Osaka, Japan), and the lubricant additive may comprise one or more derivatives of cyclotriphosphazene, for example as described in U.S. Pat. Nos. 5,587,217; 5,718,942; 5,908,817; and 6,099,762 (the disclosures of which are incorporated herein by reference for all purposes), e.g., bis (4-fluorophenoxy)—tetrakis (3-trifluoromethyl phenoxy) cyclotriphosphazene (available as X-1P™ from Dow Chemical Co., Midland, Mich.). The composite lubricant may be applied to the surface of the uppermost layer (i.e., protective overcoat layer) of a layer stack or laminate forming part of a magnetic or MO recording medium, typically a carbon (C)-containing layer such as a diamond-like carbon ("DLC") layer, as a single layer by applying thereto a mixture of the at least one primary lubricant and at least one lubricant additive in combination with a suitable mutual solvent, e.g., a hydrocarbon or perfluorinated solvent, as described in U.S. Pat. No. 5,587, 217, or applied as separate sub-layers in a desired sequence. Application of the single or separate sub-layers may be performed by any standard technique, e.g., dipping, spraying, spin coating, etc., followed by drying to remove any volatile solvents) therefrom, and if desired, by tape burnishing.

For forming a single layer of composite lubricant of thickness from about 10 to about 20 Å (after drying for solvent removal), corresponding to a lubricant additive thickness of about 2 to about 25% of the total lubricant layer thickness, the concentration of the primary lubricant in the applied solution should be in the range from about 0.05 to about 1 wt. % and the concentration of the lubricant additive in the initially applied solution should be in the range from about 0.003 to about 0.067 wt. %.

When forming a composite lubricant film comprised of separate sub-layers of primary lubricant and lubricant additive, each sub-layer may be applied in a suitable thickness from respective solutions of suitable concentrations to yield, upon drying for solvent removal, a primary lubricant sub-layer having a thickness from about 10 to about 20 Å and a lubricant additive sub-layer having a thickness from about 0.5 to about 10 Å, e.g., 10–15 Å for the primary lubricant sub-layer and about 5 Å for the lubricant additive sub-layer.

According to the invention, the radiation source is selected to provide UV photons principally of energies below the threshold energy for production of ozone ($O_3$) from oxygen ($O_2$), i.e., wavelengths>about 185 nm, principally (i.e., at least about 70%) at about 254 nm, as by use of a low pressure Hg source. For maximum utility or productivity in continuous production processing, the source should preferably have an intensity sufficient to complete irradiation of the composite lubricant film with the pre-selected dosage in a minimum interval for a given amount of lubricant additive in the composite lubricant film, e.g., about 30 sec. to about 15 min. for UV irradiation intensities ranging from about 10 to about 35 mw/cm$^2$. UV irradiation dosage for achieving durability enhancement in a particular application is determined on the basis of the particular carbon (C)-based overcoat of the media, the lubricant layer thickness, and the additive content in the composite film.

In order to further prevent or inhibit photolytic generation of $O_3$ in the vicinity of the composite lubricant film during UV irradiation thereof, the irradiation process is preferably performed within a chamber from which $O_2$ has been purged, as by flowing an inert gas (e.g., nitrogen, $N_2$) therethrough during irradiation.

EXAMPLE

Magnetic recording disks including an about 25 Å thick protective overcoat layer of dual-layer sputtered carbon were coated, in conventional fashion, with about 10–20 Å thick layers of a composite lubricant material comprised of Z-DOL containing about 10 wt. % X-1P as an additive. UV-treated disks were subjected to pre-selected irradiation dosages from a low pressure Hg discharge source at an intensity of about 35 mw/cm$^2$ and irradiation intervals ranging from about 30 sec. to about 4 min.

Figure 2:
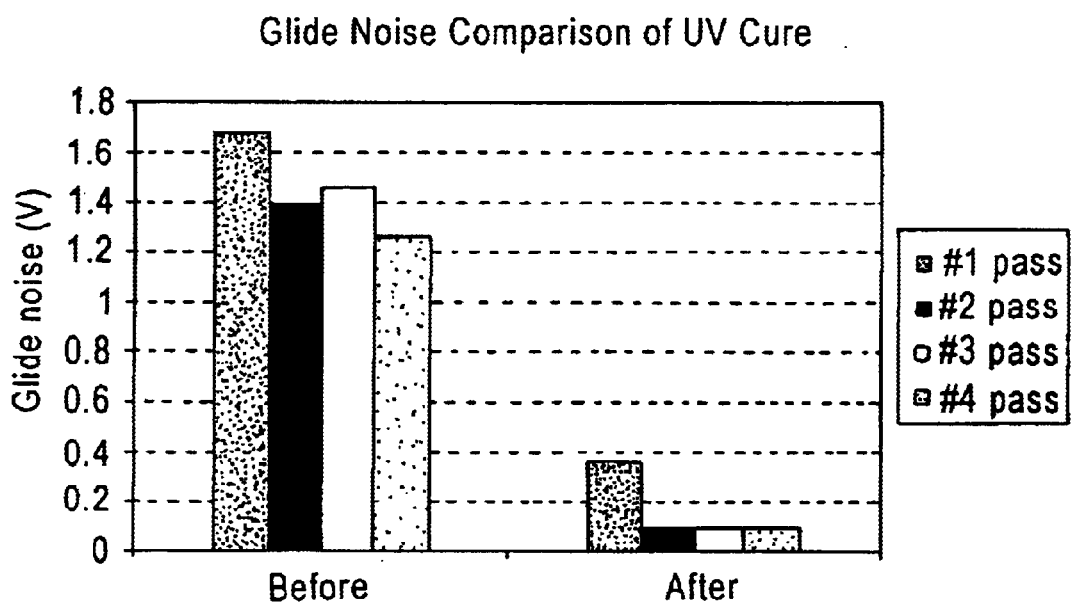
Figure 3:
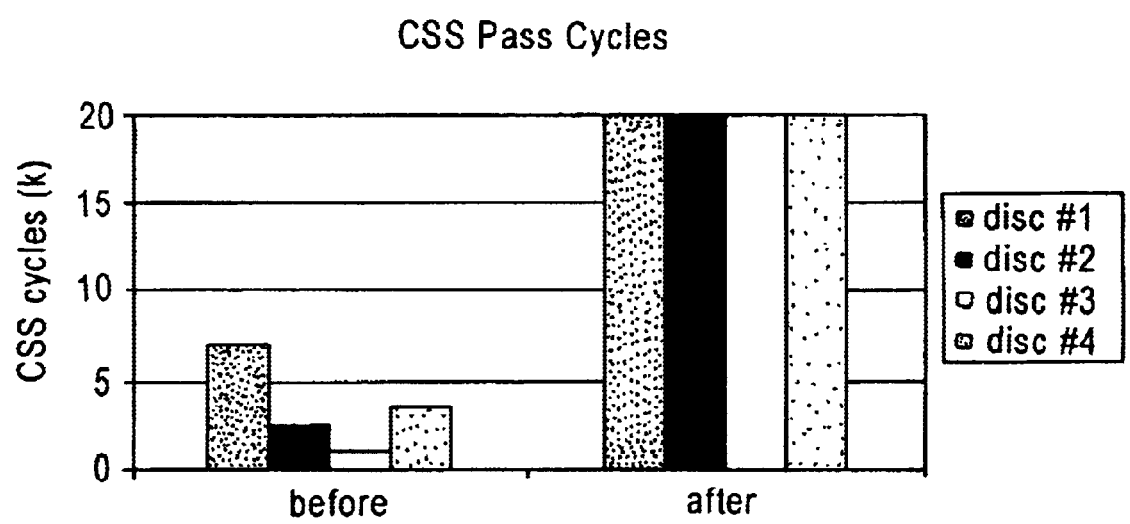

Referring to FIGS. 1–3, shown therein are bar graphs for illustrating the improvement in glide yield, glide noise, and CSS pass cycles of disk-shaped, thin film magnetic recording media provided by pre-selected UV irradiation dosage treatment of the above-described composite lubricant films according to the above-described UV irradiation parameters, relative to similarly prepared thin film magnetic recording media with untreated composite lubricant films. As is clearly evident from FIG. 1, the glide yield (i.e., percent of disks that pass a glide test for investigating the flyability of the medium when glide heads fly over and in close proximity to the medium surface) of a medium which is treated with UV of pre-selected dosage according to the present invention is greatly increased, relative to that of an untreated medium. Similarly, FIG. 2 clearly indicates that the glide noise (i.e., a sudden increase in noise detected by a PZT detector mounted on the glide head when the latter encounters or "hits" an asperity on the medium surface, e.g., a carbon/lubricant or particulate asperity. If the number of "hits" exceeds a certain critical number, the medium is considered as having failed the glide test) of a medium which is treated with UV of pre-selected dosage according to the present invention is significantly decreased, relative to that of an untreated medium. Finally, FIG. 3 indicates that the number of "CSS Pass Cycles" (i.e., the number of CSS cycles prior to medium crash. For example, in a 20K CSS test, if the medium does not crash by the end of the 20K CSS cycles of the test, the "CSS Pass Cycles" for that medium is 20K) of media which are treated with UV of pre-selected dosage according to the present invention is significantly increased, relative to that of untreated media, thereby demonstrating the enhanced durability of the UV-treated composite lubricant films afforded by the invention. In addition, fly stiction was reduced from about 6.0 gms. for untreated disks to about 4.8 gms. for UV-treated disks, and corrosion was similarly reduced from about 1.5 to about 0.55 (measured in arbitrary units).

The present invention thus provides a number of advantages over conventional methodology utilizing composite lubricant films, including the formation of more durable, tribologically robust, composite lubricant films containing a lubricant additive, e.g., X-1P, than are obtainable according to the conventional art, and is of particular utility in automated manufacturing processing of disk-shaped, carbon-overcoated, thin film magnetic and MO recording media requiring formation of stable lubricant topcoat layers for facilitating use under CSS-type operating conditions. Specifically, the present invention provides for enhanced durability composite lubricant films comprised of at least one PFPE primary lubricant and at least one lubricant additive comprised of a cyclotriphospazene derivative. Further, the inventive methodology can be readily practiced and utilized as part of conventional recording media manufacturing technology in view of its full compatibility with all other aspects of automated manufacture of disk-shaped magnetic and MO media. Finally, the inventive methodology is broadly applicable to the manufacture of a number of different products, e.g., mechanical parts, gears, linkages, etc., requiring lubrication.

In the previous description, numerous specific details are set forth, such as specific materials, structures, processes, etc., in order to provide a better understanding of the present invention. However, the present invention can be practiced without resorting to the details specifically set forth. In other instances, well-known processing materials, structures, and techniques have not been described in detail in order not to unnecessarily obscure the present invention.

Only the preferred embodiments of the present invention and but a few examples of its versatility are shown and described in the present invention. It is to be understood that the present invention is capable of use in various other embodiments and is susceptible of changes and/or modifications within the scope of the inventive concept as expressed herein.

What is claimed is:

1. A data/information storage and retrieval medium with enhanced Contact Start/Stop ("CSS") performance, comprising:
    (a) a disk-shaped substrate including at least one surface, a layer stack formed on said at least one surface and including at least one magnetic or magneto-optical ("MO") recording layer and an uppermost, protective overcoat layer comprising a carbon (C)-based material; and
    (b) a lubricant topcoat layer on said protective overcoat layer, comprising at least one perfluoropolyether compound as a primary lubricant and at least one phosphazene derivative as a lubricant additive, said lubricant topcoat layer treated solely with UV radiation at a dosage sufficient to:
        (i) increase the glide yield of said medium, relative to that provided by the same medium but with an untreated lubricant topcoat layer;
        (ii) decrease the glide noise of said medium, relative to that provided by the same medium but with an untreated lubricant topcoat layer; and
        (iii) increase the number of CSS pass cycles of said medium before failure, relative to that provided by the same medium but with an untreated lubricant topcoat layer.

2. The medium according to claim 1, wherein:
    said at least one phosphazene derivative comprises bis (4-fluorophenoxy) tetrakis (3-trifluoromethyl phenoxy) cyclotriphosphazene.

3. The medium according to claim 1, wherein:
    said lubricant topcoat layer (b) is in the form of a single layer containing said at least one perfluoropolyether compound and said at least phosphazene derivative.

4. The medium according to claim 1, wherein:
    said lubricant topcoat layer (b) is in the form of separate sub-layers of said at least one perfluoropolyether compound and said at least one phosphazene derivative.

5. The medium according to claim 1, wherein:
    said lubricant topcoat layer (b) is from about 10 to about 20 Å thick.

* * * * *